March 31, 1936.  F. W. COTTERMAN  2,035,865
BRAKE MECHANISM
Filed June 12, 1930

INVENTOR.
Frederick W. Cotterman
BY
Burton & McConkey
ATTORNEYS

Patented Mar. 31, 1936

2,035,865

UNITED STATES PATENT OFFICE 2,035,865

BRAKE MECHANISM

Frederick W. Cotterman, Dayton, Ohio, assignor to Bendix Brake Company, South Bend, Ind., a corporation of Illinois Application June 12, 1930, Serial No. 460,646

12 Claims. (Cl. 188—78)

My invention relates to improvements in brake mechanism, particularly as applied to automobiles, and pertains primarily to adjusting and self centering means for brake friction mechanism supported to float within the drum to anchor at either end depending upon the direction of drum rotation, and more specifically to that form wherein the adjustment is located diametrically opposite from the anchoring abutment.

It is here illustrated in a brake embodiment commercially known as duo servo, which is a construction wherein two complementary brake shoes are articulated at two adjacent ends by a manual adjustment and supported adjacent their opposite ends for floating movement to anchor at either end, and novel cam applying mechanism is provided to urge either end of the friction means against the drum.

Inasmuch as the brakes are utilized while the vehicle wheels are rotating in a forward direction most of the time, it is the brake lining of the forward, or primary, shoe which is usually subjected to the greatest wear, and the resulting wear of the lining on the two shoes is therefore not equal.

My invention has for one object the provision of mechanism in a brake as characterized which serves to center the brake friction means automatically following application thereof and upon return to the release position this centering means acts through the adjustment mechanism and operates to center the friction means in a predetermined manner regardless of the adjustment thereof.

Hitherto a rotatable adjusting wheel, reversely threaded at each end, has been utilized to connect the adjacent floating ends of the brake shoes for the purpose of moving them away from or toward each other to adjust for wear on the brake lining, wherein each threaded end of the connecting member was of equal pitch and the adjusting movement for each of the brake shoes was therefore identical. In view of the unequal wear of the lining on the two shoes the result was not satisfactory and to remedy this it has been customary to provide an adjustable cam to determine the idle position of one of the shoes.

One object of my invention is to eliminate this auxiliary cam adjusting means and arrange the rotatable connecting nut in such a way that its rotation alone may compensate for the unequal wear on each of the shoes, while at the same time providing mechanism cooperating with said adjusting nut to automatically maintain the floating shoes properly centered with relation to the brake drum.

Various other objects and meritorious features of my invention will become apparent from the following description taken in conjunction with the drawing wherein like numerals refer to like parts throughout the several figures and wherein.

Figure 1:
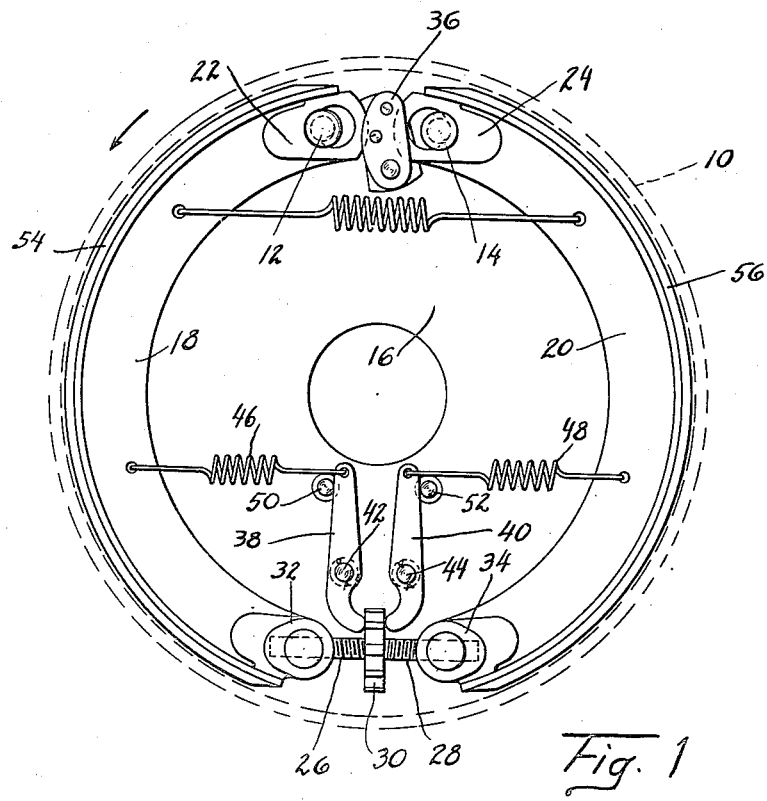
Fig. 1 is a side elevation with the end of the brake drum removed.

Supported within the brake drum 10, which has been indicated in Fig. 1 by dotted lines, by means of studs 12 and 14 which are secured to the backing plate 16 are my primary and secondary expansible friction members 18 and 20 respectively. Adjacent ends of the friction members are provided with flanges 22 and 24 in each of which there is an elongated slot through which the studs 12 and 14 extend.

The opposite ends of the brake shoes are connected by means of a compensating nut, the opposite ends 26 and 28 of which may be provided with threads of different pitch, and intermediate which ends is a thumb nut 30 by means of which the compensating connecting member may be manually rotated. The threaded ends of the compensating connecting member are received by corresponding threaded apertures in flanges 32 and 24 which are secured to the adjacent floating ends of the brake shoes.

The shoes 18 and 20 are expanded towards the revolving brake drum 10 by means of a cam member 36 which acts against the flanges 22 and 24 and is actuated by means of conventional mechanical linkage adapted to be manually operated.

Two levers 38 and 40 are pivotally mounted on backing plate 16 upon the pins 42 and 44. The upper ends of the levers are held yieldingly toward the brake shoes by means of springs 46 and 48 and stop pins 50 and 52 are secured to the backing plate to limit this movement of the levers.

The lower ends of the levers 38 and 40 bear against opposite sides of the thumb nut 30 and maintain the floating ends of the brake shoes properly centered when the levers are abutting against the stop pins 50 and 52.

Figure 2:
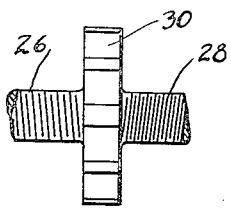
Fig. 2 is an enlarged detail of my adjusting compensating nut, somewhat modified.

The threaded portion 26 of the connecting member may be of a coarser pitch than the thread on the opposite end 28 and is so shown in the modification of Fig. 2. The difference in pitch may be determined by experimentation as to the rapidity with which various types of brake linings wear when subjected to certain frictional stresses. Assuming that the lining 54 secured to the primary shoe wears more rapidly than the lining 56 on the secondary shoe, due to the difference in the pitch of the threads on opposite ends of the connecting member, when the thumb nut 30 is rotated to adjust for wear of the brake lining the primary shoe 18 will be moved a greater distance than will the secondary shoe for a given turn of the adjusting thumb nut 30, thus automatically compensating for the difference in wear on the two linings 54 and 56.

The springs 46 and 48 tend at all times to maintain the levers 38 and 40 against the stop pins 50 and 52, thereby maintaining the thumb nut 30 properly centered and of necessity the floating ends of the brake shoes to which it is rigidly secured also properly centered with relation to the rotating brake drum 10.

Thus I have provided a single manually rotatable adjusting means adapted to cooperate in a novel way with floating brake mechanism such as the duo servo to compensate for different amounts of wear between the linings of the two brake shoes, and at the same time to retain the brake shoes properly centered in regard to the rotatable brake drum, whereby the possibility of the lining of either shoe dragging against the rotating drum at any time is eliminated and a more effective and efficient brake structure is provided.

Having illustrated a preferred form of my invention, various modifications will be apparent to those skilled in the art and for that reason I limit myself only within the scope of the appended claims.

I claim:

1. In a servo brake assembly including a primary and a secondary shoe, a single rotatable adjusting member adapted to compensate for greater wear in the primary shoe lining, and a yielding tension means between said adjusting means and each of said shoes adapted to retain said shoes centered.

2. In combination with a rotatable brake drum, brake friction means arranged within the drum, a pair of levers individually pivotally supported within the drum, each lever anchored at one end to an adjacent portion of the brake friction means and coupled at the opposite end with said brake friction means to cooperate with the opposite lever to normally automatically center said brake friction means within the drum.

3. In combination with a rotatable brake drum, a backing plate, brake friction means arranged within the drum, a pair of levers individually pivoted to the backing plate within the drum, a stop determining the idle position of each lever, and a spring yieldingly constraining one end of each lever toward its stop, said lever so arranged that the opposite end of each lever is coupled with the friction means to normally automatically center the same within the drum.

4. In combination with a rotatable brake drum, a pair of floating friction members adjustably connected at one pair of adjacent ends, cooperating positioning means connected to each friction member operable to urge the floating assembly toward the other friction member, and means engageable with said positioning means limiting the movement thereof.

5. A brake comprising, in combination, floating friction means, an adjusting device therefor, and centering mechanism engageable with said adjusting device on either side thereof, said centering mechanism being yieldably urged at all times into contact with the opposite sides of said adjusting mechanism in a direction substantially parallel to the floating movement of said friction means.

6. A brake comprising, in combination, a drum, floating friction means within the drum, and a pair of members resiliently mounted to oppose one another and engaging therebetween a portion of said floating friction means to center the same within the drum.

7. A brake comprising, in combination, a drum, floating friction means within the drum, an adjusting device therefor, and a pair of members resiliently mounted to oppose one another and engaging said adjusting device therebetween to center the friction means within the drum when the brake is released.

8. A brake comprising, in combination, a drum, floating friction means within said drum, and a yielding tension means connected to spaced parts of said friction means and to a portion of said friction means intermediate said parts to yieldingly retain the floating friction means centered within the drum.

9. A brake comprising, in combination, a drum, floating friction means within said drum and shaped to conform with the inner periphery of the drum, and a pair of yieldingly urged means each tensioned to a separate part of said friction means and adapted to engage in common a portion of said friction means to center the friction means within the drum.

10. In combination with a rotatable brake drum, floating brake friction means arranged within the drum, an adjustment between one part of said friction means and another part thereof operable to adjust the idle position of said parts with respect to the drum, and a pair of means directly engaging opposite sides of said adjustment and resiliently acting in opposition to one another to automatically position said friction means within the drum.

11. In combination with a rotatable brake drum, floating brake friction means arranged within the drum, an adjusting mechanism between one part of said friction and another part thereof, said adjusting mechanism adapted to unequally adjust the idle position of said parts with respect to the drum, and means directly engaging a portion of said adjusting mechanism and providing resilient forces acting in opposition upon said portion to automatically position said friction means within the drum.

12. A brake comprising, in combination, a rotatable brake drum, floating friction means within the drum capable of bodily movement during application against the drum, an adjusting device for said friction means adapted to compensate for wear, centering mechanism engageable with said adjusting means to automatically position the friction means within the drum, said centering mechanism being tensioned to said floating friction means to receive additional centering force from the bodily movement of said friction means.

FREDERICK W. COTTERMAN.